United States Patent [19]
Chang et al.

[11] Patent Number: 5,636,208
[45] Date of Patent: Jun. 3, 1997

[54] TECHNIQUE FOR JOINTLY PERFORMING BIT SYNCHRONIZATION AND ERROR DETECTION IN A TDM/TDMA SYSTEM

[75] Inventors: Li-Fung Chang, Holmdel; Robert A. Ziegler, Red Bank, both of N.J.

[73] Assignee: Bell Communications Research, Inc., Morristown, N.J.

[21] Appl. No.: 626,858

[22] Filed: Apr. 12, 1996

[51] Int. Cl.[6] .................................................. H04L 7/04
[52] U.S. Cl. .......................... 370/347; 371/47.1; 375/365; 370/514
[58] Field of Search ...................... 370/18, 95.3, 100.1, 370/105.4, 106, 342, 347, 513, 514; 375/354, 365, 366, 368; 371/42, 47.1

[56] References Cited

U.S. PATENT DOCUMENTS

| | | | |
|---|---|---|---|
| 4,984,249 | 1/1991 | Long et al. | 375/368 |
| 5,392,289 | 2/1995 | Varian | 371/47.1 |
| 5,473,615 | 12/1995 | Boyer et al. | 371/47.1 |
| 5,539,751 | 7/1996 | Sabel | 375/368 |

*Primary Examiner*—Benedict V. Safourek
*Attorney, Agent, or Firm*—Joseph Giordano; Loria B. Yeadon; James W. Falk

[57] ABSTRACT

An improved technique for simultaneously performing bit synchronization and error detection of received digital data bursts in a time division multiplexed/time division multiple access (TDM/TDMA) system, such as that used in conjunction with low power portable digital telephony. With the improved technique both bit synchronization and error detection are performed simultaneously to thereby reduce latency in the transceiver. Since round-trip delay is reduced, echo suppression techniques may not be needed.

52 Claims, 9 Drawing Sheets

TECHNIQUE FOR JOINTLY PERFORMING BIT SYNCHRONIZATION AND ERROR DETECTION IN A TDM/TDMA SYSTEM

FIELD OF THE INVENTION

This invention relates to an improved technique for jointly performing bit synchronization and error detection of received digital data bursts in a time division multiplexed/ time division multiple access (TDM/TDMA) communication system. More particularly, the invention relates to a bit synchronization and error detection technique characterized by reduced latency.

BACKGROUND OF THE INVENTION

Various systems have been developed and implemented to match the explosive demand for wireless communication. Such systems include cordless telephone systems, cellular mobile radio systems, public packet radio data networks, and radio paging systems. As outlined in commonly assigned Ariyavisitakul et al U.S. Pat. No. 5,084,891, Jan. 28, 1992 ("Patent '891"), the disclosure of which is incorporated by reference herein, these systems are each characterized by various advantages and drawbacks.

Among such other wireless communication systems, low power digital systems have been developed which support low-speed, portable use (for example, by pedestrians). Similar to cellular radio, low power portable digital telephony uses a fixed base unit, referred to as a radio port (RP), and a number of fixed or portable transceivers (hereinafter referred to as subscriber units (SUs)) that can simultaneously access that port on a multiplexed basis.

Low power multiplexed radio links commonly operate on a time division multiplexed/time division multiple access basis to provide a number of separate fully duplex demand-assigned digital channels between an RP and each of its associated SUs. Each RP transmits time division multiplexed bit streams on a pre-defined carrier frequency. In turn, each SU that accesses an RP responds by transmitting a TDMA burst on a common, pre-defined carrier frequency that may be different from that used by the RP (in the case of frequency-division duplexed systems), or that may be the same as that used by the RP (in the case of time-division duplexed systems). The power used by the transmitter in the SU may range between 5–10 milliwatts or less on average and provide a range of several hundred to a thousand feet. With this transmission range, an RP might simultaneously serve 20 to 30 separate locally situated SUs.

In such a system, the same TDM channels may be re-used at RPs that are spaced sufficiently far apart to reduce co-channel interference to an acceptably low level, but yet conserve valuable spectrum. To provide access to the wireline telephone network, each RP may be interfaced, typically through a conventional fixed distribution facility, over either a copper or fiber connection to a switching machine at a local central office. The switching machine is suitably programmed, in a similar manner as is a Mobile Telephone Switching Office (MTSO), to controllably and automatically handoff calls from one RP to another as subscribers move their SUs from RP to RP.

PACS (Personal Access Communication Systems) is a standard which supports low power, portable digital communication. As illustrated in FIG. 1, PACS architecture consists of four main components: the SU (portable 2 or fixed 4), the RPs 6 which are connected to a radio port control unit (RPCU) 8 and an access manager (AM) 10. An interface A, the air interface, provides a connection between the SU and the RP. Interface P provides the protocols required to connect the SUs through the RPs to the RPCU.

With PACS, a large number of radio frequency (RF) channels may be frequency division multiplexed with 80 MHz separation, or time division multiplexed. A variant of PACS, known as PACS-UB and developed for the unlicensed U.S. PCS band between 1920 and 1930 MHz, uses time division duplexing. While the present invention applies equally to frequency- and time-division duplexed systems, without loss of generality, the following material will consider only frequency-division duplexed link examples, for simplicity and clarity.

FIG. 2A shows the forward link (or downlink) from an RP to an SU. One 2.5 ms frame corresponds to eight 312.5 µs time slots. Each time slot consists of 120 bits. The first 14 bits form a synchronization channel and the next ten bits form a system signaling logical channel called the Slow Channel. The Frame Synchronization Channel and the Slow Channel are used to derive initial frame synchronization for each SU. User information is transmitted in the Fast Channel which comprises the next 80 bits. The next 15 bits are used for a cyclic redundancy check for error detection, while the last bit, known as the power control bit, provides an indication to the SU to adjust its transmitting power up or down.

FIG. 2B illustrates the reverse link (or uplink) from the SUs to an RP. Again, each 2.5 ms frame is divided into eight 312.5 µs time slots during which 120 bits are transmitted. The first twelve bits form a guard channel, while the next two bits enable differential encoding. This guard channel is used to prevent different TDMA bursts that are transmitting from different SUs from overlapping in time as a result, for example, of propagation delays. The SU does not actually begin transmission of the uplink burst until the differential encode bits.

As in the forward link, the next ten bits correspond to the Slow Channel, and data is contained in the next eighty bits. The next fifteen bits are used for error detection, while the last bit serves as a pad bit to provide an even number of bits for transmission.

The frequency band for PACS is 1850 MHz to 1910 MHz (uplink) paired with 1930 MHz to 1990 MHz (downlink), the "Broadband PCS Spectrum" allocated by the U.S. FCC in June 1994. As known in the art, PACS utilizes $\pi/4$-shifted, differential quadrature phase shift keying (DQPSK) in which the digital bit stream is separated into two binary streams before the bits are differentially encoded. Typically, this is done by directly mapping pairs of input bits onto relative phase increments of $\pm(\pi/4)$ and $\pm(3\pi/4)$ of the baseband signal.

As explained in greater detail in Patent '891, one crucial function required in TDM/TDMA systems such as PACS is the need to achieve synchronization between an RP and its associated SU. In particular, three levels of synchronization are needed: frame, burst and symbol synchronization.

Frame synchronization is necessary for an SU to determine the start of a frame and the occurrence of its currently assigned TDM/TDMA channel therein. In a frequency-division duplexed system, frame synchronization is readily achieved in an SU by having the RP continuously transmit in a TDM mode during which a known framing sequence, including "idle" information in idle TDM channels, would be transmitted at a known time relative to the start of each frame. The SU would extract frame timing of its associated RP by using a digital correlator to reset a frame counter whenever the framing sequence was received. Once frame timing is determined, the SU would then expect to receive successively occurring TDM packets arriving within a designated time window that is sufficiently wide to allow for slippage due to frequency drift.

Knowledge of time boundaries between successive π/4-shifted DQPSK symbol transmissions is important to obtain good radio link performance. Symbol synchronization is needed to determine the start of a data symbol situated within any transmitted TDM packet or TDMA data burst. Symbol synchronization can be derived from the received data as an integral part of the demodulation process, for example, as disclosed in Chuang et al U.S. Pat. No. 4,941,155, Jul. 10, 1990. While it will be understood that a particular application of this invention to radio transceivers may require the recovery of symbol timing for proper operation, specific details of the symbol synchronization process are known in the art and therefore are beyond the scope of this disclosure.

Burst synchronization is necessary to ensure that an SU is able to discern when it should transmit a TDMA burst in response to a TDM packet received from the RP and that both the RP and SU are able to discern which specific bit in each received TDMA burst or TDM packet, respectively, is the first bit therein. Unfortunately, each TDM packet transmitted from an RP to an associated SU is subject to timing misalignment. In the SU, this misalignment can arise from frequency drift. Burst misalignment can arise in an RP from the different propagation time delays associated with the SUs transmitting to that RP, frequency drift of local oscillators and reference oscillator error in an RP receiver. Burst misalignment can be large after an outage. Due to the need to detect and properly compensate for bit slippage arising from misaligned bursts or packets, burst and packet synchronization is difficult and complex to achieve and maintain over a sufficiently wide range of slippage, especially when the use of overhead bits for such synchronization is not feasible due to link efficiency considerations.

Apart from synchronization, a second crucial function needed in TDMA is error detection—the ability of both an RP and an SU to reliably determine whether the bit stream in any received TDM packet or TDMA burst contains an erroneous bit. Bits are frequently corrupted through interference and/or noise. If an erroneous bit occurs, then the packet or burst containing that bit needs to be blanked. With high probability the receiver should be able to detect this condition and implement appropriate recovery mechanisms.

Error detection is conventionally achieved by adding one or more parity bits to each data word to form a codeword. In its simplest form, parity takes the form of one bit that represents odd/even parity. In sophisticated forms, multiple parity bits are used to store a cyclical redundancy check (CRC). Codes for CRC generation have the desirable property that even multiple bit errors, up to a maximum number which depends on the particular code selected, will not result in the transmitted codeword being changed to another codeword. This characteristic allows a receiver to detect an error condition in which up to the maximum number of bit errors have occurred. Further, even where the number of bit errors exceeds this maximum number, with a good choice of code there is a high probability that the error in transmission will be detected. Codes that have low probability of undetected error are crucial to robust performance of wireless communication links.

Patent '891 describes a technique for bit synchronization and error detection of received digital data bursts in a TDM/TDMA system which addresses the concerns described above. This technique is believed to have broad applicability to radio link signal processing required by contemporary digital wireless technologies. In particular, the current U.S. JTC Standards (soon to be ANSI standards) for the PACS and PACS-UB air interfaces require the use of a particular channel code for error detection that is also amenable to bit synchronization in the manner described in the aforementioned patent.

As described in Patent '891, a codeword from an error detecting code is to be located and decoded within a (larger) window of demodulated bits (the "burst window"). It is assumed that the bits on either side of the codeword do not carry information pertinent to the established link and can therefore be discarded by the receiver. Prior to transmission, the first and last bits of this codeword are inverted in order to enable the synchronization capabilities of the code. As long as the received codeword falls wholly within the demodulation window, and in addition, the codeword falls within a maximum distance from a "reference" position, then the codeword can be successfully decoded in the absence of radio link errors caused by noise or interference. FIG. 4, which illustrates possible alignments for received codewords in a demodulated burst, shows this maximum distance.

In FIG. 4, times $t_1$ and $t_2$ delineate a reference codeword position. A first burst 42 illustrates a maximum retard codeword position which begins prior to time $t_1$ and ends prior to time $t_2$. A second burst 44 illustrates a reference codeword position which falls within times $t_1$ and $t_2$. A third burst 46 illustrates a maximum advance codeword position 46 which begins subsequent to time $t_1$ and ends subsequent to time $t_2$.

The maximum synchronization distance is determined by the number of CRC bits according to the following formula:

$$d_{max} \leq \text{floor}[(n-k-2)/2]$$

where n is the codeword size, k is the information sequence size, and the floor function returns the largest integer not greater than its argument. For PACS, a (105, 90) cyclic codeword may be used wherein n is 105 and k is 90. Thus, (n−k)=15, so the maximum synchronization distance is 6 bits.

A block diagram of an encoder circuit that implements the channel code required by the PACS and PACS-UB standards for transmission of a TDM or TDMA burst is illustrated in FIG. 3. In this example, the encoder circuit calculates fifteen parity bits for each 90-bit informational bit stream for subsequent inclusion in a TDM bit stream using the g(x) generator specified by a polynomial equation for a corresponding cyclic code. The channel encoder appends the resulting parity bits to that informational bit stream to form a cyclic codeword and modifies the resulting cyclic codeword to include the first set of marker bits.

As shown in FIG. 3, information bits appearing on line 383 to be transmitted are sent to the modulation circuitry in the RP's or SU's transmission chain through multiplexer 340, line 345, adder 360, and line 387. The information bits are also simultaneously sent into a feedback shift register circuit 330 that calculates the CRC bits for error detection by dividing the information bits by a predetermined polynomial generator g(x) which is suitable for the PACS codeword size and information sequence size.

In this example, the g(x) divider encoder circuit 330 comprises a series arrangement of D type flip flops $331_1$ to $331_8$, where reference numeral $731_1$ refers to a series arrangement of six D type flip flops while reference numerals $331_2$ and $331_4$ each represents a series arrangement of two D type flip flops. Adders $332_1$ to $332_7$ combine the respective outputs of flip flops $331_1$ to $331_8$ to form the divided output bit stream. The reset input to all the D type flip flops is connected to CLEAR lead 352 from the clocking and control circuit 350 which generates its clock and control signals based upon the occurrence of each pulse in the burst timing signal appearing on lead 381. As shown, a feedback line 337 from flip flop $331_8$ leads to adder 310.

The bit stream received by the g(x) divider encoder circuit 330 at adder 310 is provided along lead 315 to an input A of multiplexer 326. Operating under a control signal provided from line 354 to an input C, the multiplexer 326 provides the bit stream to the input of the first set of flip flops $331_1$ in the g(x) divider encoder circuit. When the last information bit for the current TDM or TDMA burst is shifted into the divider circuit 330 in this manner, the flip-flop elements $331_1$ through $331_8$ will contain the CRC bits, which are the remainder of the polynomial division of the information sequence by the code's generator polynomial g(x). The multiplexer 340 then selects the shift register contents appearing at its input B, which are then shifted out to the modulation circuitry to complete the burst. The full codeword is the concatenation of the information bits (including both the Slow and Fast Channels in PACS and PACS-UB) and the CRC bits.

The first and last bits of the codeword are inverted with adder 360 by a marker sequence generated by the clocking and control circuit 350. For example, the adder 360 may comprise an XOR gate which receives a logic one signal along line 356 as the first and last bits in the codeword are received from the multiplexer 340. In this way synchronization properties referred to above are obtained.

A prior art technique for decoding a received codeword is explained in greater detail in reference to FIG. 5. This technique is based on that described in detail in Patent '891. As shown, incoming bit stream data entering the circuit from the demodulator first encounters the synchronization circuitry 100. The first and last bits of a reference codeword position are inverted at a binary adder 120 by a marker sequence generated by clock and control circuitry 180. The marked demodulated bit sequence is then circularly rotated by a prescribed amount in a gated shift register circuit 125, and the resulting marked and rotated sequence enters another shift register circuit 130 that effects a division operation by the code's generator polynomial g(x). The syndrome sequence that is produced by the divider circuit 130 will, in the absence of transmission errors, uniquely identify the position of the received codeword with respect to the reference position. This translates directly into a fixed amount of delay that must be inserted in order to align the position of the received codeword with the reference codeword position for further processing by the error detection circuitry 150.

While the synchronization syndrome is being calculated in the g(x) divider 130, the demodulated burst contents are stored in a burst buffer 105. After the synchronization syndrome is calculated, the demodulated bit stream is delivered to shift register 110, which can effect a range of fixed delays by varying the "tap point" where data is pulled out through multiplexer 115. The tap point is chosen through a synchronization syndrome lookup table 135. Since negative delay cannot be created, it is established that the reference codeword position corresponds to an intermediate delay through the shift register 110. Therefore, if the codeword is in fact found at the maximum retard codeword position, for example, as shown in FIG. 4, it can be advanced relative to the reference position by taking it through multiplexer 115 at the earliest tap point, which corresponds to zero shift register delay (i.e., for shift register 110). Similarly, a codeword found at the maximum advance position will result in a choice of shift register tap point that effects maximum delay through the shift register 110, in order to retard the received codeword timing to match the reference position.

Once the received codeword has been aligned with a reference position, it is ready for processing by error detection circuitry 150. A second marker sequence, aligned with the known first and last codeword bit positions, is generated by the clock and control circuitry 180 and is applied to another binary adder 151 to effect inversion of those bits. This restores the codeword to its original form prior to transmission, and allows the use of essentially standard error detection circuitry. A second g(x) divider 155, which preferably is separate from but identical to g(x) divider 130, produces an error syndrome. If the syndrome bits are all zeros, a successful decode operation is assumed to have been completed and bits are read out of a second burst buffer 165 directly for subsequent receive processing (e.g., by a speech decoder for voice service).

A codeword error is declared if either the synchronization circuitry 100 or the error detection circuitry 150 fails to produce recognizable syndrome patterns. This is accomplished with the use of a logical OR gate 170 operating on the separate sync error and error detect error flags. In the presence of a decoding error, the bits read out of burst buffer 165 can be blanked by logically AND-ing the decoded data bits with the inverted error flag.

In practice, it is found that the apparatus of FIG. 5 requires somewhat more than two bursts of latency between the incoming bit stream and the outgoing decoded data bits. This is because the syndromes generated by the g(x) dividers 130 and 155 cannot be determined until the bit stream for the entire demodulated burst is shifted through it.

In summary, the scheme described in the '891 Patent comprises two separate processing stages, one for synchronization and one for detection after the synchronization operation is complete. This scheme allows a pipelined implementation (operating at the air interface bit rate) with just over two (2) bursts of latency. When combined with the latencies introduced by burst buffering (for speech transmission), other radio link signal processing (e.g. demodulation), and wireline transmission into the public network, the overall round-trip delay for a PACS or PACS-UB system can approach 10 msec. Since the ITU-T recommends employment of echo suppression methods when the round-trip delay exceeds 10 msec, this latency may result in the need for additional echo suppression techniques. This, in turn, may lead to added costs and more complicated designs for receiver implementations. Thus, it would be desirable to reduce latency in the synchronization and error detection circuit.

SUMMARY OF THE INVENTION

It is an object of the invention to meet the above described need and others. In fulfillment of this object, described are a method and apparatus in which the latency associated with one of the burst buffers in a TDM/TDMA system is reduced. In addition to reducing latency, the method and apparatus of the invention serve to reduce the overall count of logic gates required to implement the decoder.

As described in more detail below, the present technique encompasses a system and method for transmitting an informational bit stream of digital data through a communication channel from a transmitter to a receiver and at the receiver for recovering bit synchronization and performing error detection of a corresponding received bit stream. This technique includes receiving a second burst corresponding to a transmitted first burst and extracting from the second burst a received word corresponding to the marked first cyclic codeword. A plurality of candidate codewords are obtained in parallel from the first word. These candidate codewords are each advanced, retarded or aligned with respect to a reference position. A plurality of error syndromes are obtained from each of the plurality of candidate codewords from which it is determined (1) whether bit errors exist in the received word and (2) whether a single position for the received word falls within a predetermined range. Where no bit errors are detected and a single position for the received word falls within the predetermined range, the received word is read out or from a point which corresponds to a proper position.

According to one aspect of the invention, the candidate codewords are obtained by inserting marker bits into the received word at successive increments along parallel processing paths and dividing each resulting parallel marked word by a binary polynomial generator $g(x)$ to yield the plurality of error syndromes. The marker bits are inserted by inverting values of successive sets of first and last bits which potentially delineate the received word. For a particular implementation, the polynomial generator $g(x)$ is $x^{15}+x^{14}+x^{13}+x^{12}+x^{11}+x^9+x^8+x^6+1$.

According to another aspect of the invention, the received word is shifted by an amount corresponding to the determined position and is discarded when it is determined from the error syndromes that: bit errors exist in the received word; no position for the received word is determined; or multiple positions for the received word are determined.

According to a further aspect of the invention, the received word is provided in parallel to a plurality of adders, each of the adders inverting respective sets of first and last bits which potentially delineate the received word to obtain parallel sets of marked words. The parallel sets of marked words are divided in parallel by a corresponding number of binary polynomial generators $g(x)$ to yield the plurality of error syndromes. Each of the plurality of error syndromes is output to a corresponding NOR gate, whereby it is determined whether any non-zero error syndromes occur.

Another feature of the invention is that the received word may form part of either an incoming TDMA burst or TDM packet, for example, as in a wireless communication system based on a PACS standard. In such a system, the received word includes a (105,90) cyclic codeword.

BRIEF DESCRIPTION OF THE DRAWINGS

The teachings of the present invention can be readily understood by considering the following detailed description in conjunction with the accompanying drawing, in which.

DETAILED DESCRIPTION

The present invention advantageously employs improvements in the combined synchronization and error detection scheme of preexisting systems as described above, particularly when applied in a PACS environment. As mentioned above, several systems, such as PACS, employ a DQPSK modulation scheme in which two bits are transmitted in every symbol. This implies that codewords can be received only at every other possible bit position (since it is not possible for the demodulator to slip its receive window by a half symbol). Moreover, the code generator used in a system such as PACS is capable of detecting and correcting received codeword offsets up to 6 bits in either direction from the receiver reference window. Combining these two facts, it is seen that the total number of possible candidate received codeword positions is not large. For example, in one receiver configuration, the candidate positions might be:

5 bits advanced (+5)

3 bits advanced (+3)

1 bit advanced (+1)

1 bit retarded (−1)

3 bits retarded (−3)

Figure 4:
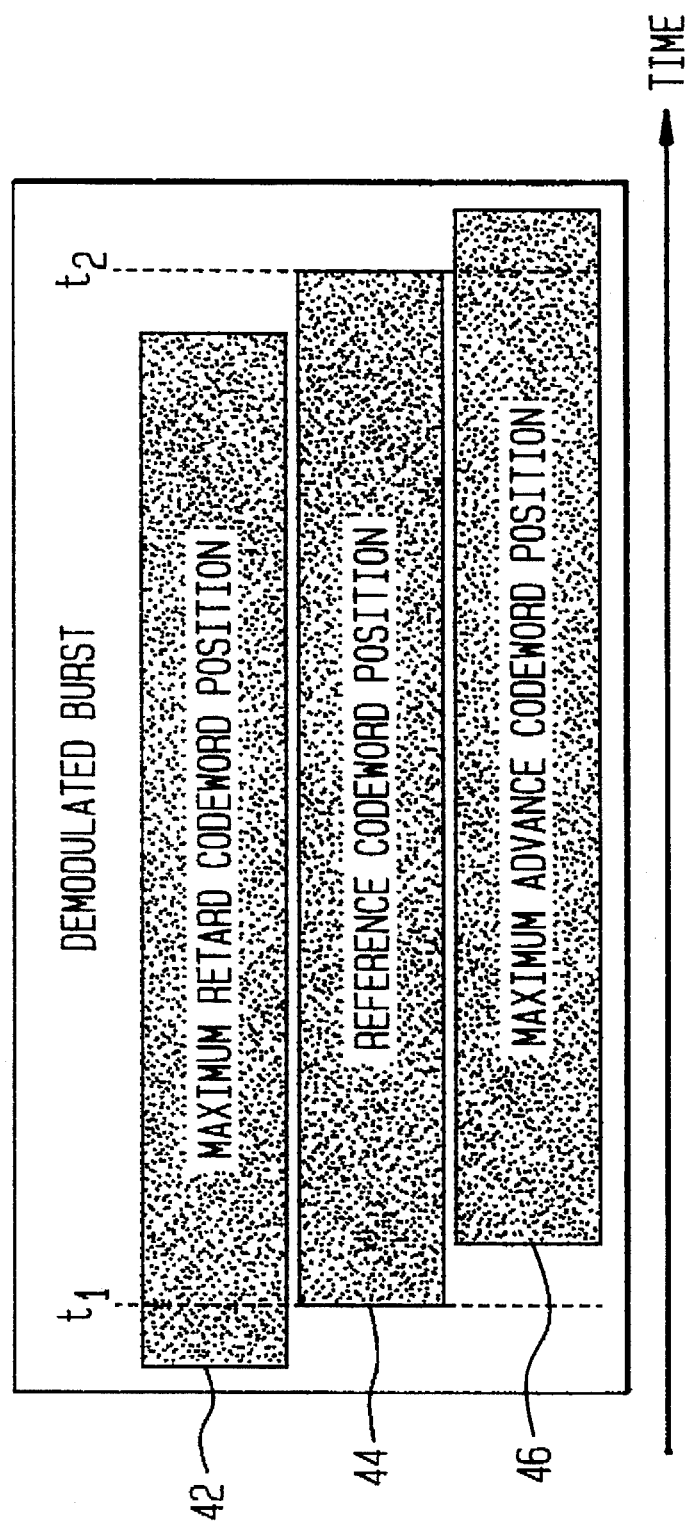
FIG. 4 is a diagram showing possible alignments for received codewords in a demodulation burst.

5 bits retarded (−5), each with respect to the reference position as illustrated in FIG. 4. Another configuration is the following:

6 bits advanced (+6)

4 bits advanced (+4)

2 bits advanced (+2)

reference aligned (0)

2 bits retarded (−2)

4 bits retarded (−4)

6 bits retarded (−6)

Figure 5:
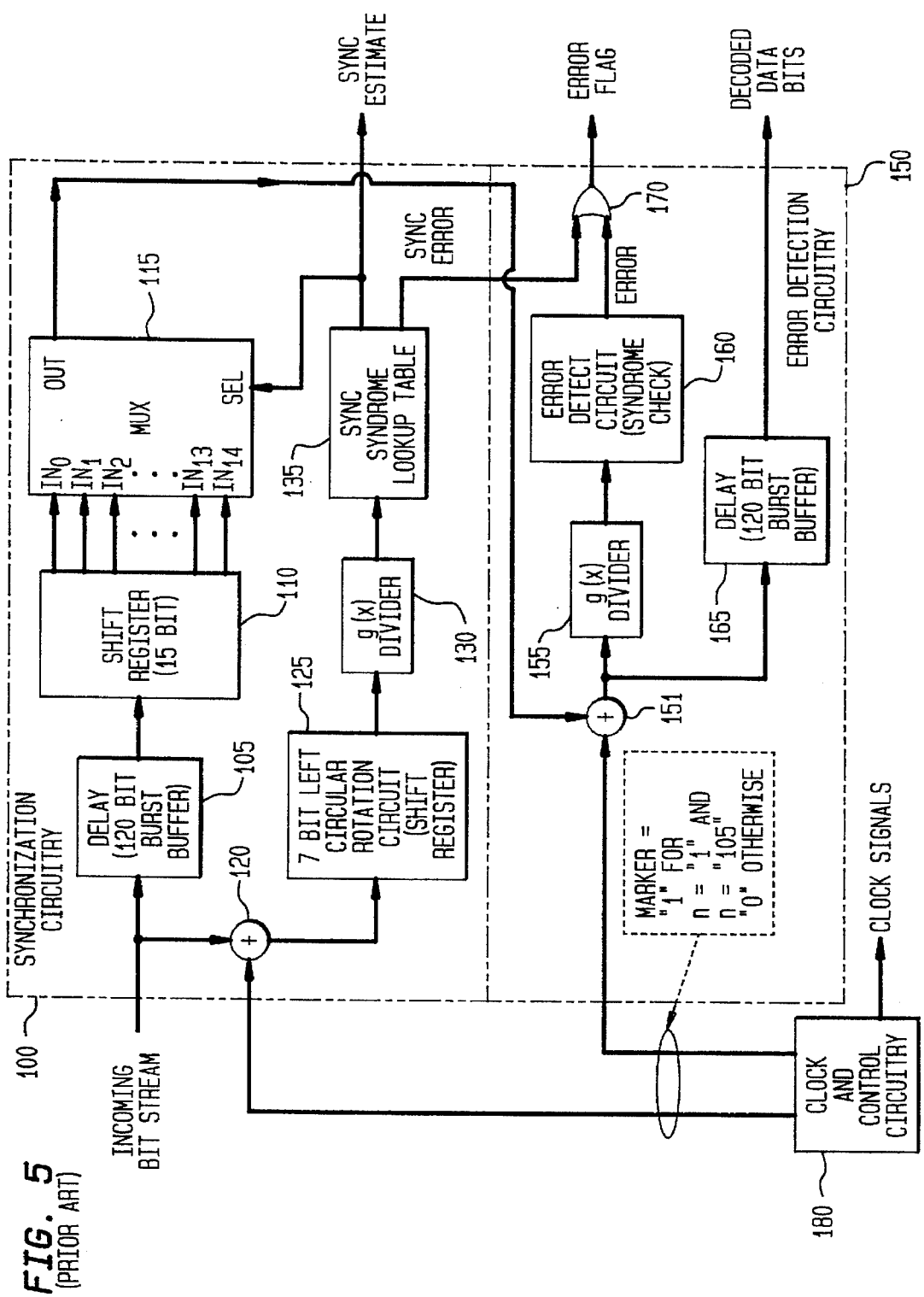
FIG. 5 is a block diagram of a prior art synchronization and error detection circuit.

Compared to the implementation of FIG. 5, we have found that we can actually reduce complexity (in terms of gate count) and reduce the delay through the circuit with this approach in its application to systems such as PACS.

The principles underlying the invention are illustrated in reference to the examples shown in FIGS. 6A, 6B, 7, and 8.

Figure 3:
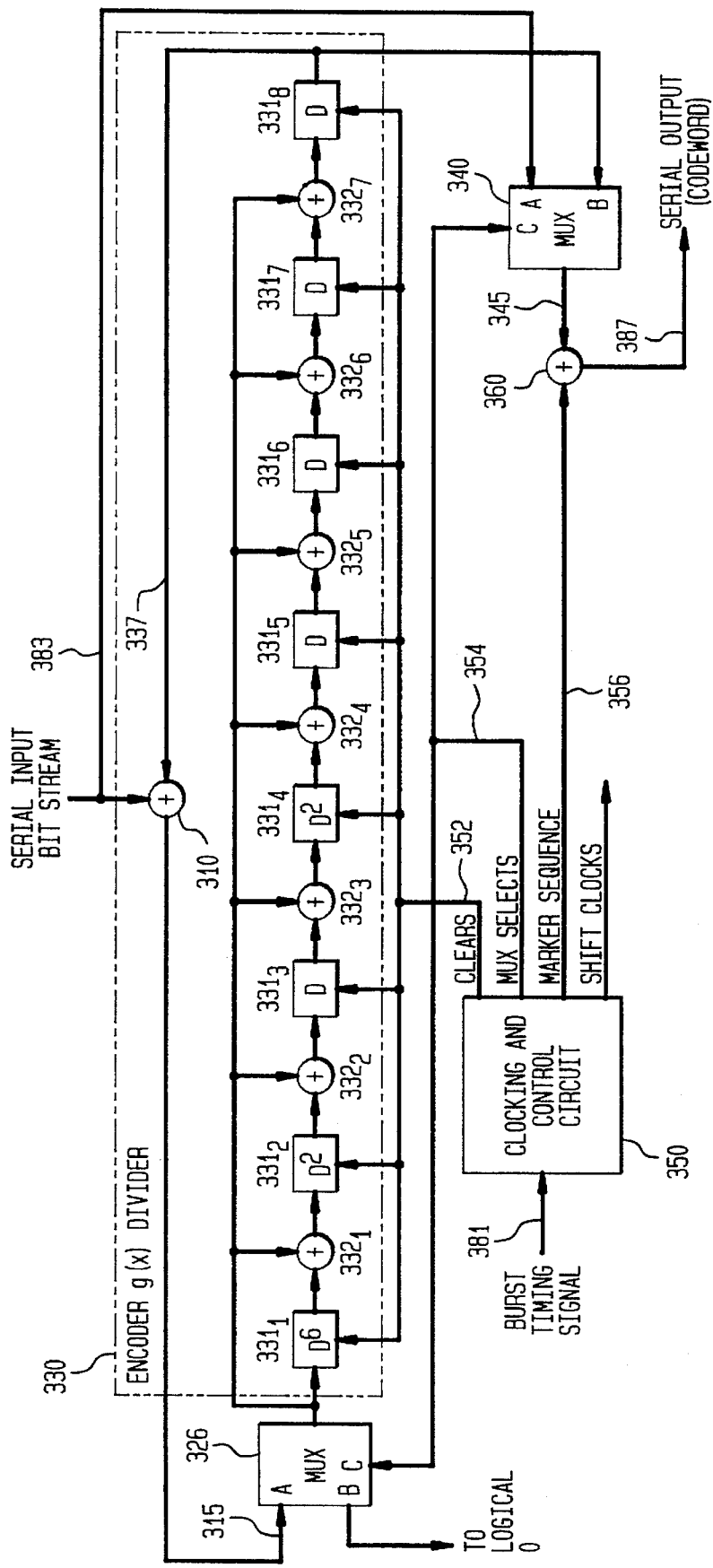
FIG. 3 is a block diagram of a channel encoder that implements the channel code required by the PACS and PACS-UB standards.

According to the present invention, a sequence of information bits is first encoded into a suitable codeword, A, prior to its transmission with the first and last bits of the codeword being inverted to form a first set of marker bits, M1. The resulting transmitted word, T equals A+M1. FIG. 3 illustrates a technique for performing this step.

Within each receiver, in either the RP or SU, both synchronization and error detection are performed on each received word R. Under error-free conditions and with no bit slippage, received word R equals a corresponding transmitted word T. However, under normal TDM/TDMA transmission conditions, received word R from time to time might be offset from transmitted codeword T and/or contain one or more bit errors, thereby necessitating synchronization recovery and error detection of received word R. A technique for accomplishing these processes simultaneously is explained in greater detail below in reference to a particular embodiment which is generally applicable to a receiver in either an RP or an SU.

Figure 6A:
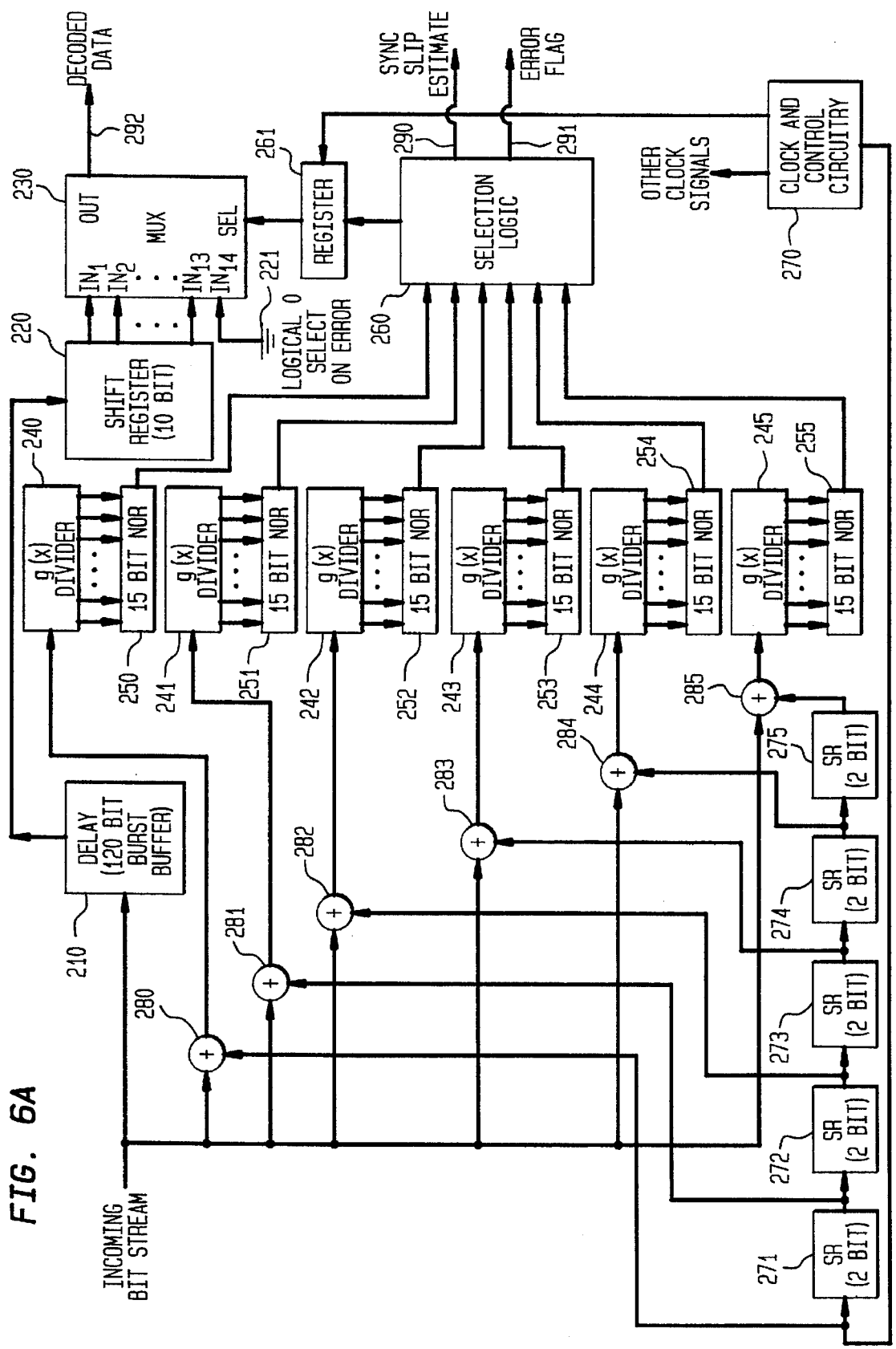
FIG. 6A is a block diagram of an improved synchronization and error detection circuit in accordance with the invention.

FIG. 6A is a block diagram which shows an improved synchronization and error detection circuit according to the invention. In this example, an incoming demodulated bit stream is input to a delay buffer 210 and to a series of binary adders (for example, XOR gates) 280 to 285. These inputs are added respectively to a marker sequence which is delayed by integer numbers of symbols through shift registers 271 to 275.

Each g(x) divider circuit 240 to 245 provides a 15 bit input to a corresponding NOR gate 250 to 255. The respective outputs of the NOR gates 250 to 255 are input to a selection logic circuit 260. Based on this input, the selection logic circuit provides a logic signal to a register 261 whose timing is controlled by an output from the clock and control circuitry 270. The register 261 provides a selection input to a multiplexer 230 which receives the delayed bit stream from the delay buffer 210 and a shift register 220. Based on these inputs, the multiplexer outputs decoded data in series.

With this arrangement, the incoming bit stream is processed by the six parallel g(x) divider circuits 240 through 245. The clock and control circuitry 270 generates a marker sequence that inverts the first and last codeword bits for each of the potential received codeword positions by inputting to the binary adders 280 to 285 a logic signal 1 for the expected first and last bits of the codeword and a logic signal 0 for the other bits of the codeword. The set of one-symbol (two-bit) shift registers 271 to 275 successively delays the marker sequence in order to align it with the respective candidate received codeword positions.

In this example, the first g(x) divider 240 represents the maximum advance codeword position as shown in FIG. 4, and the last g(x) divider 295 represents the maximum retard codeword position. In this particular configuration, only odd codeword position offsets are found (that is, those corresponding to −5, −3, . . . , +5), so in fact none of the g(x) dividers correspond to the reference position (0 bits offset). It will be understood that an alternate configuration, such as mentioned above, could be utilized to provide the candidate receive codeword positions that are offset from the reference window by an even number of bits (that is, by −6, −4, +6).

In the specific case of the code chosen for PACS, each of the g(x) dividers will likely produce a different 15 bit error syndrome. If there were no transmission errors and if the received codeword position is within the maximum advance and retard positions, then the g(x) divider corresponding to that received codeword position will produce a syndrome of all zeros. The corresponding 15-bit NOR circuit, one of NOR circuits 250 to 255, will produce an output of a logical one in that case. With high probability, all of the other g(x) dividers will produce non-zero syndromes, the corresponding 15-bit NOR circuits will produce logical zeros, and the correct received codeword position will have been uniquely and properly identified.

While the syndromes are being calculated, the data for the burst in question is also stored in a delay burst buffer 210. After the syndromes are calculated and the received codeword position is identified, the data is read out from the burst buffer 210 through a ten bit shift register 220. Based on the logical levels presented by the 15-bit NOR circuits 250 to 255, the selection logic 260 presents a selection signal to the multiplexer 230 that reads the data out of the shift register 220 at a particular tap point presented at inputs $IN_0$ to $IN_5$ based on the determined received codeword position. The tap point is chosen to equalize the received codeword data to a consistent reference point in time (different from the reference codeword positions of FIG. 4) for further receive processing. The register 261 holds the selection signal for the duration of the period in which the burst is read out of the buffer 210 since the next received burst will be entering the g(x) dividers and changing the syndromes at the same time.

In some cases, for example, due to detectable link transmission errors, none of the calculated syndromes will be zero, and therefore a unique received codeword position cannot be determined. In other cases, for example, due to undetectable link errors or falsing, a zero syndrome will be produced by the wrong g(x) divider, or even by multiple g(x) dividers. In the former case, that is, where a single one of the g(x) dividers erroneously produces a zero syndrome, the selection logic cannot determine that an error has occurred. However, in the latter case, that is, where more than one of the g(x) dividers erroneously produce zero syndromes, it can be concluded with high probability that an error condition has occurred. Thus, where no nonzero syndromes are produced or where more than one nonzero syndromes are produced, the selection logic determines that an error has occurred, and the multiplexer will select node 221 ($IN_0$ of MUX 230) to read out a sequence of zeros instead of the unreliable burst buffer contents for subsequent receive processing.

In this example, the selection logic 260 supplies a select signal to an input SEL of multiplexer 230, registered by 261, in response to the outputs of the 15 bit NOR logic 250 through 255. The first part of the logic may comprise an exclusive-or (XOR) function; a valid codeword is presumed to have been recovered if and only if one of the NOR circuit outputs is at logical one, and the rest are zero. This function qualifies a one-to-one mapping between appearance of a logical one at a particular NOR output and choice of an output delay from shift register 220 that equalizes the received codeword offset to the desired output position on lead 292. For example, if the codeword is successfully recovered at the maximum advance position, then 15-bit NOR device 250 will produce a logical one output. This would cause the selection logic to produce a multiplexer control signal that selects the maximum delay output through the shift register (at input "$IN_5$" of multiplexer 230) in order to synchronize the recovered codeword with the subsequent receive processing operations beyond output lead 292. On the other hand, if none or more than one of the NOR outputs 250 through 255 produce a logical one output, then the selection logic 260 must produce a multiplexer control signal that selects the blanking signal 221 (via input "$IN_6$" of the multiplexer), in order to prevent unreliable data from being processed by later receive circuitry stages. Finally, the selection logic 260 provides external indication of the decode error status, via lead 291, and, in the absence of decoding errors, of the synchronization offset of the recovered codeword, via lead 290.

Figure 6B:
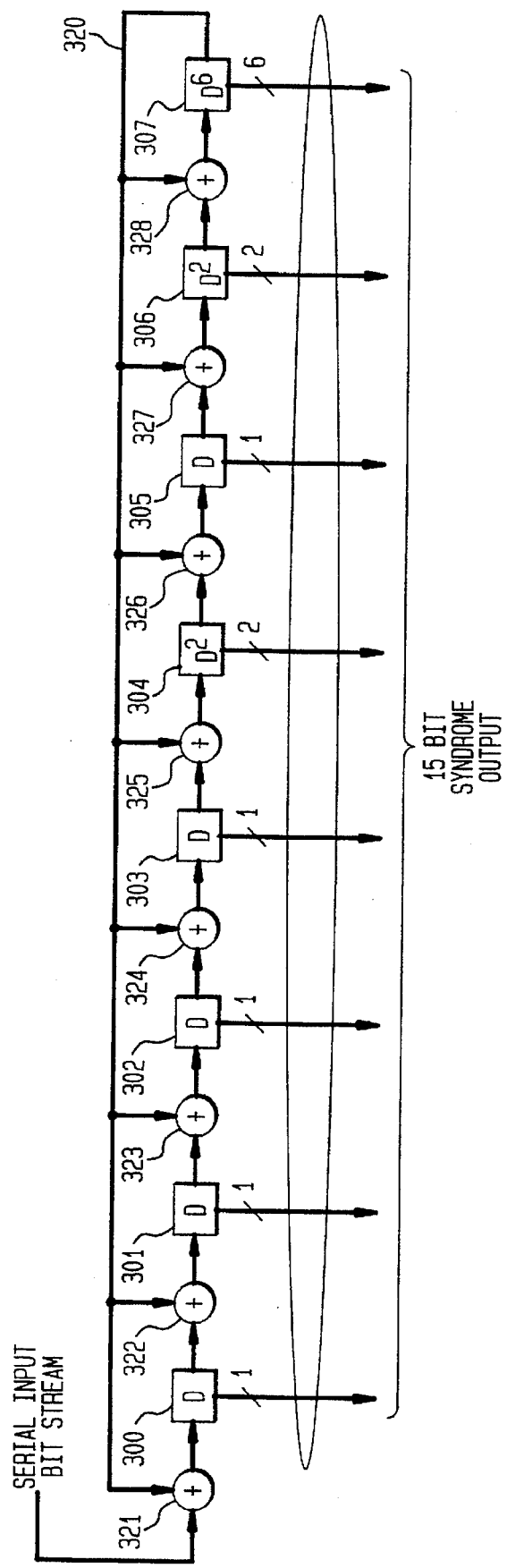
FIG. 6B is a block diagram of a feedback shift register implementation of a $g(x)$ divider, in accordance with the invention.

FIG. 6B is a block diagram of one of the g(x) dividers 240 to 245 illustrated in FIG. 6A. Specifically, each g(x) divider includes a feedback path 320 and adders 321 to 328. A plurality of shift registers 300 to 307 having fifteen separate cells, specifically D type flip flops, are arranged in series. As shown, reference numerals 304 and 306 each depict two D type flip flops arranged in series so as to provide a two bit output; reference numeral 307 illustrates a series arrangement of six D type flip flops each providing a single output. Together, the flip flops 300 to 307 provide a fifteen bit error syndrome which is input in parallel to corresponding fifteen bit input NOR gates 250 to 256.

Each of these adders may be implemented through a single XOR gate. In operation, the clocked output of the last flip flop within flip flops 307 is fed back over lead 320 to an input of each of the adders 321 to 328. The incoming serial bit stream and the output of cells 300 to 307 are respectively applied as another input to each of adders 321 to 326. Accordingly, after all the bits in a word have been shifted through the g(x) dividers 240 to 245, the respective 15-bit parallel outputs of the g(x) dividers each contains a syndrome value which equals the remainder of the polynomial division of an incoming word by a specific function for g(x). In the example shown in FIG. 6, this equation is the following:

$$g(x)=x^{15}+x^{14}+x^{13}+x^{12}+x^{11}+x^9+x^8+x^6+1$$

This is the generator polynomial specified by the PACS and PACS-UB standards. It should be understood that alternate dividers may be used as appropriate for embodiments of the invention used in different standards.

With the arrangement of FIGS. 6A and 6B, the g(x) dividers simultaneously check for errors in the six respective bit streams output from adders 280 to 285 and determine the relative position of the received codeword. Where no transmission errors have occurred and the received codeword position falls within the maximum advance and retard positions, the corresponding g(x) divider 240 to 245 produces a syndrome of all zeros. This in turn results in the corresponding NOR gate 250 to 255 producing a logic one output, which is utilized in the manner described above to read out the data from shift register 220 at the appropriate tap point. On the other hand, where no logic one output is obtained from NOR gates 250 to 255 or where multiple logic one outputs are obtained, an error flag is produced and the bit stream is blanked.

Figure 7:
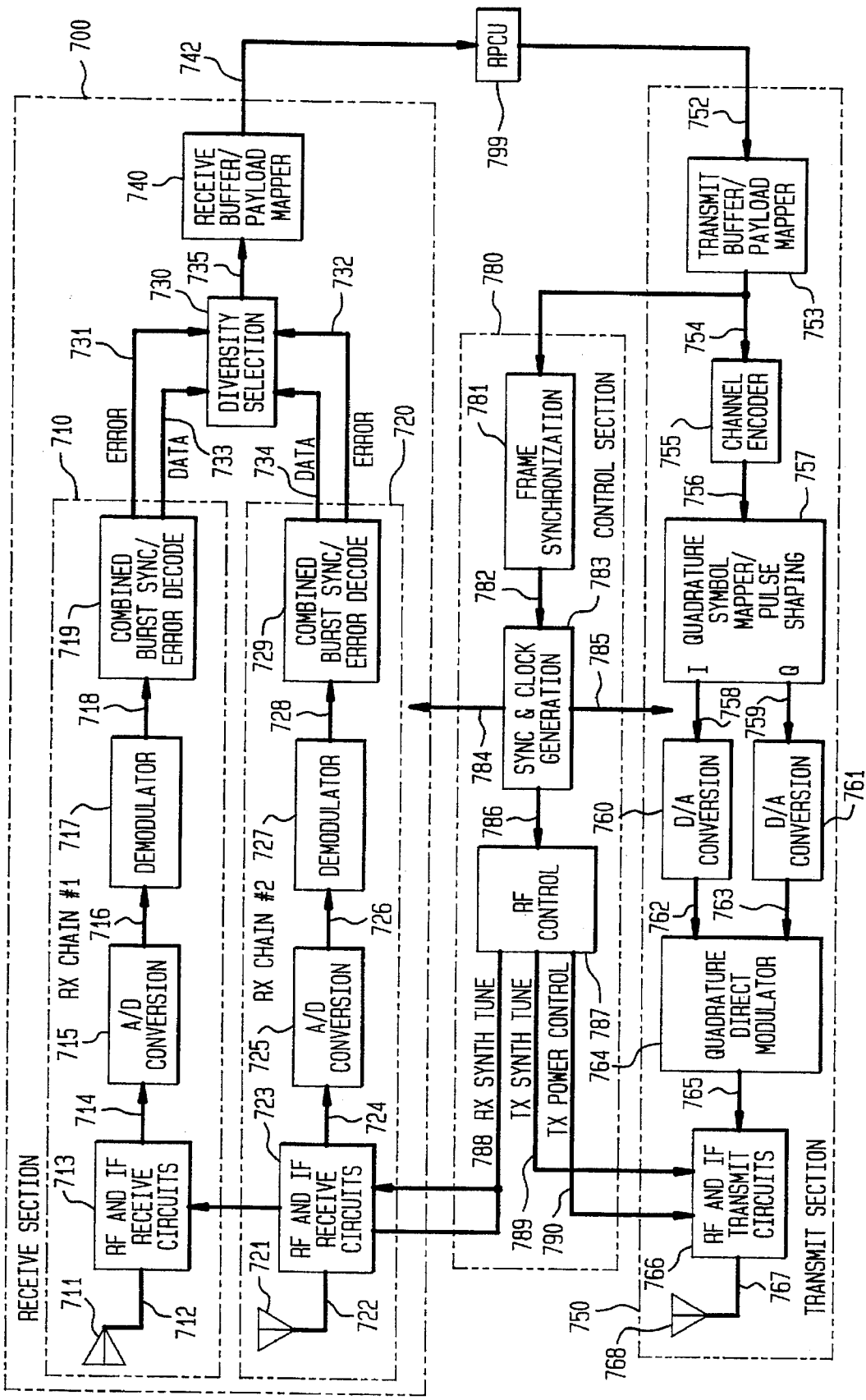
FIG. 7 is a block diagram of an RP transceiver circuit incorporating the invention.
Figure 8:
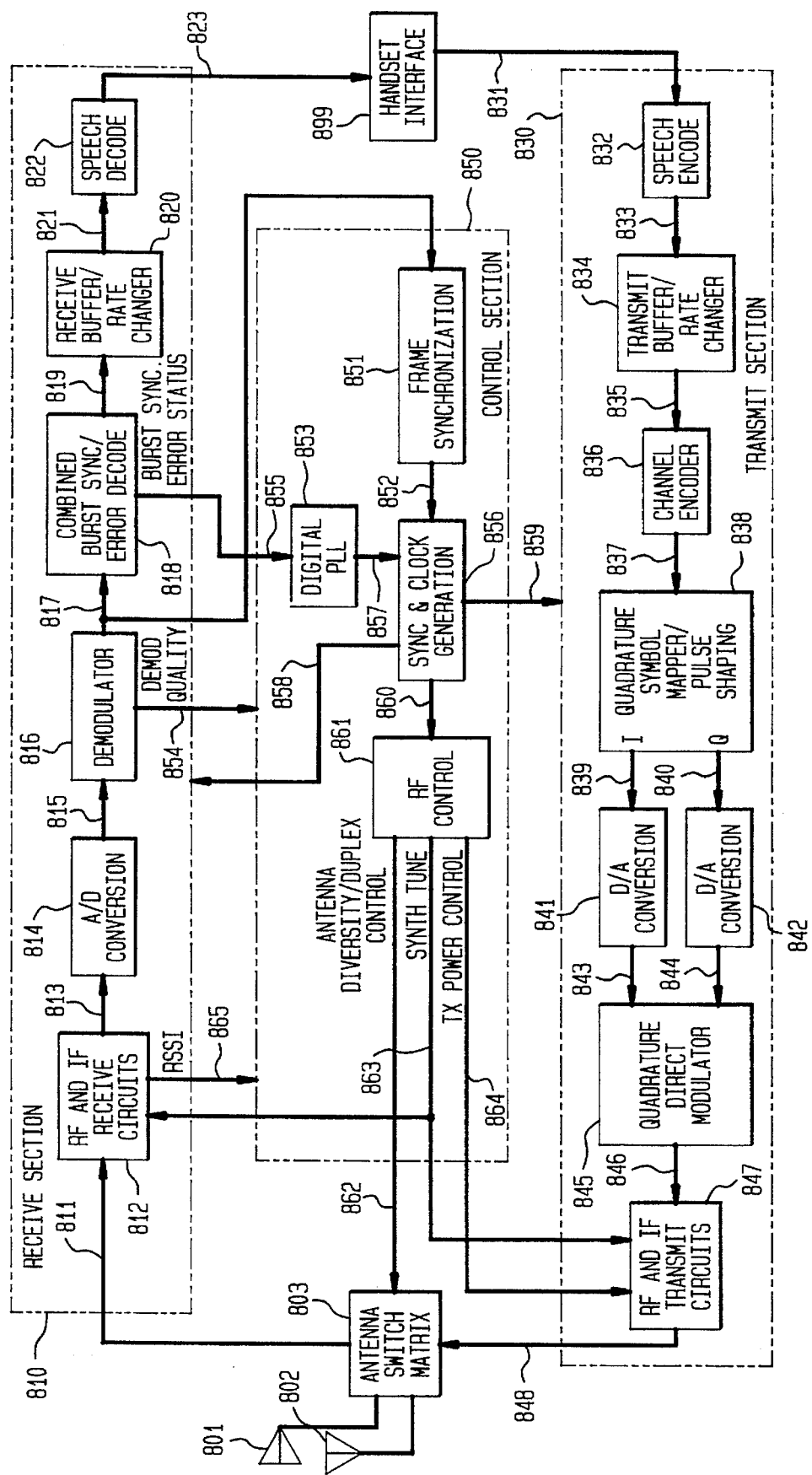
FIG. 8 is a block diagram of an SU transceiver circuit incorporating the invention.

As mentioned above, the circuit shown in FIG. 6A may be utilized in either an RP or an SU to achieve bit synchronization and error detection with reduced latency. FIGS. 7 and 8 respectively describe such implementations.

Figure 1:
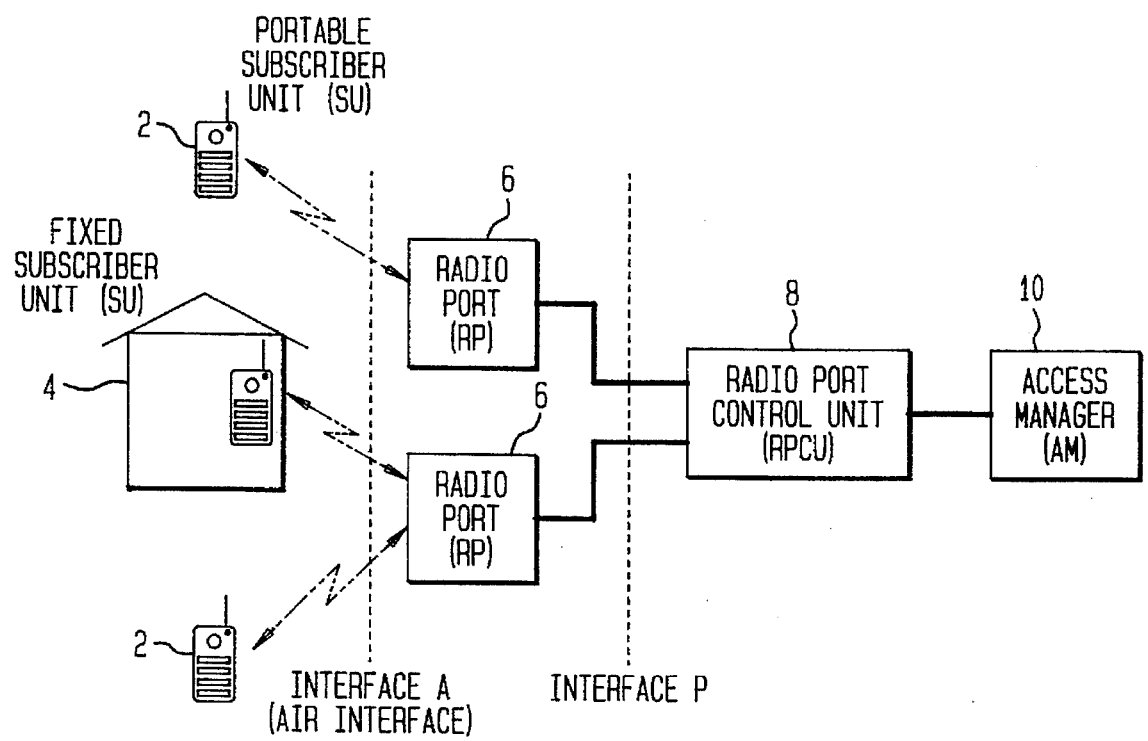
FIG. 1 is a block diagram of a PACS system architecture.
Figure 2A:
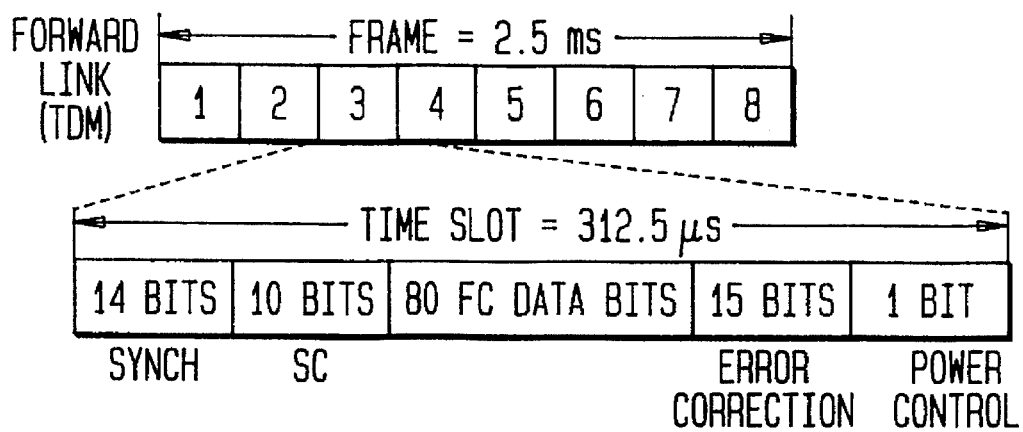
FIGS. 2A and 2B are diagrams of the downlink (RP to SU) and uplink (SU to RP) frame structures, respectively, that are specified for frequency-division duplexed PACS.
Figure 2B:
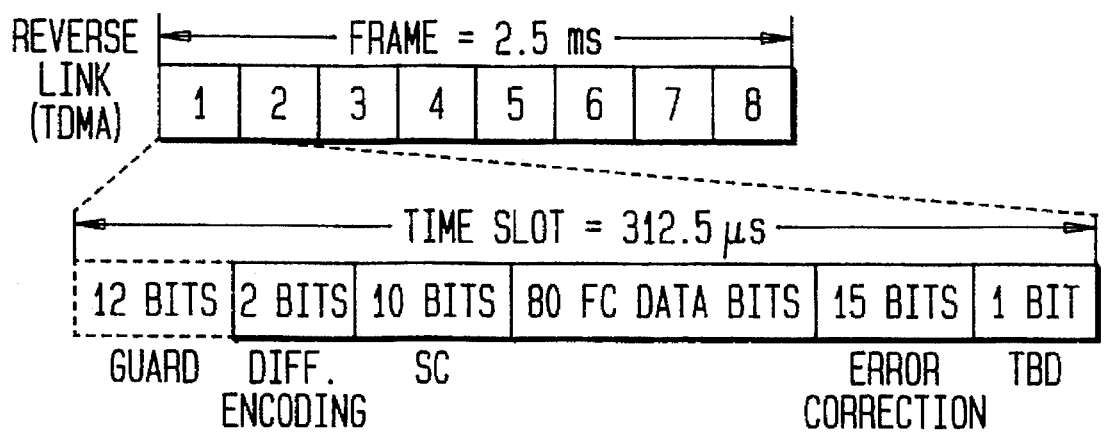

FIG. 7 depicts a simplified block diagram of circuitry used to implement an RP in a TDM/TDMA system, such as PACS. As shown, a port 6 (from FIG. 1) contains a receiving section 700, a transmitting section 750, and a control section 780. The receiving section 700 takes radio transmissions from SUs served by the RP, demodulates and decodes them, and maps them into the proper format for subsequent wireline transmission over interface P for processing by the serving RPCU 8. (See FIG. 1.) The transmitting section 750 takes wireline transmissions from the serving RPCU received over interface P, maps them into TDM bursts, encodes them with the error detecting code, modifies the codeword by inverting first and last codeword bits to provide the synchronization capability, and modulates and transmits them over the air to the served SUs. The control section 780 derives frame synchronization from the RPCU to RP transmissions received on the wireline P interface, produces all necessary system clocks and synchronization pulses to the transmit and receive circuitry, and controls the transmit and receive RF circuitry in order to maintain communication with the served SUs. The information content sent over the P interface is typically protocol control information and digitized speech signals, processed by the RPCU and the SU. The RP acts as an error-detecting RF modem and information relay in the PACS architecture.

Bit streams sent from the RPCU 8 and received by the port on lead 752 are buffered and mapped into PACS bursts (the Slow and Fast Channel fields) at buffer/mapper 753. The formatted data is then sent via lead 754 to the channel encoder 755, as depicted in FIG. 3. At the same time, the formatted data is sent to the frame synchronization circuit 781 (a triggerable correlator) in the control section 780, in order to synchronize the RP to the downlink stream sent by the RPCU.

The channel encoder 755 calculates the CRC, fills that field of the TDM burst, and sends the burst bit stream via lead 756 to the π/4 DQPSK symbol mapper 757, where differential encoding and transmit pulse shaping (square-root raised cosine as specified in the PACS standard) are performed. The resulting oversampled baseband digital waveforms are presented on in-phase (I) and quadrature (Q) rails 758 and 759 for data conversion at D/A converters 760 and 761, respectively. The resulting analog I and Q signals are then fed to the direct modulator 764 on leads 762 and 763. The intermediate frequency signal that is produced on lead 765 is then mixed up to radio frequency and amplified in RF section 766, before being sent to the transmit antenna 768 for transmission to the served SUs.

The receive section 700 contains two separate receive chains 710 and 720, to implement antenna diversity to combat multipath fading. Signals transmitted by SUs that are served by the RP impinge on receive antennae 711 and 721. With proper physical arrangement of the antennae, signals from the same SU will appear to be approximately uncorrelated. Considering the first receive section 710 (the second section 720 operates in the same manner), signals are routed from the antenna via lead 712 to the analog receive circuitry 713. This circuitry produces a low-frequency IF signal on lead 714 that is processed by A/D converter 715 to produce a digital waveform on lead 716 for subsequent digital receive processing. The demodulator 717 processes the digital waveform and produces an information bit sequence on lead 718. The sequence is then sent to the combined burst synchronization and error detection circuitry 719 that is the subject of this invention. Due to variations in round-trip delay from RP to SU, and to differences in SU transmit and RP receive clocks, the exact position of the received codeword within the received TDMA burst may not be known exactly (as diagrammed in FIG. 4). If there are no radio link errors, and if the codeword location is within the synchronization range of the decoder, then the transmitted information sequence will be recovered and the Slow and Fast Channel contents will be available for further processing.

The purpose of the diversity selection circuit 730 is to determine which of the receive chains 710 and 720 has most reliably recovered the transmitted codewords. There is significant prior art in the area of diversity selection algorithms, so we describe one possibility for illustration. If one decoder of 719 and 729 indicates receive error and the other does not (via leads 731 and 732), then the recovered information stream will be sent on to the receive buffer/payload mapper 740 via the data paths 733 or 734. If both decoders indicate successful codeword recovery, then it is highly likely that they both recovered the same codeword. However, it is also possible that either one or both receive chains has falsely determined that a codeword has been recovered when in fact there may have been link errors and/or a codeword receive position beyond the synchronization range of the decoder. Resolution of these ambiguities is beyond the scope of the present invention, and is not discussed further in this disclosure. Finally, both decoders could indicate link errors, in which case the information sequence is blanked (filled with a stream of zeros) on lead 735.

The receive buffer/payload mapper takes synchronized and decoded information streams and maps them from PACS bursts to the appropriate P interface format for transmission to the RPCU. The RPCU then processes the Slow and Fast Channel contents, for example to recover digitized speech in order to send it out on the public switched telephone network.

The main purpose of the control section 780 is to ensure that the RP remains synchronized with the downlink information stream from the RPCU. If this synchronization is lost, or when the RP is first powered up, it does not transmit any RF energy until frame synchronization is recovered. This is accomplished with the use of a digital correlator in frame sync circuit 781, that resets the sync and clock generation circuitry 783 via lead 782 when the frame sync pattern is observed on lead 754. Once the P-interface synchronization is obtained, then the sync and clock generation circuit 783 distributes various synchronization and clocking signals to the receive section 700, the transmit section 750, and the RF control subsection 787 of the control section. In turn, the RF control circuitry 787 performs functions such as tuning of the transmit and receive synthesizers on lines 788 and 789, and turning the transmit power amplifier on and off as necessary via control line 790.

This now concludes the discussion of the circuitry used to implement both the RP and our inventive technique therein. Accordingly, the discussion will now address the circuitry used to implement the SU as well as the specific implementation of the improved inventive technique therein.

Application of the invention to SU circuitry is illustrated in FIG. 8. As in the case of the RP, the circuits are divided into receive section 810, transmit section 830, and control section 850. However, application of those sections to transceiver operation are somewhat different than for the RP, and so bear further explanation to elucidate the role of the invention in SU application.

The receive section 810 has a very similar objective to that of the RP receiver: to recover the bits contained in a TDM burst transmitted by the RP. However, it is from the SU's receive section that frame synchronization is obtained.

Through the action of the RF control circuit 861, the SU attaches the appropriate antenna 801 or 802 to the receive section 810 through the antenna switch matrix 803, in order to implement receive antenna diversity. There are various strategies for approximating two-receiver selection diversity, as seen in the RP, but with only a single receiver section. We assume that such a scheme is employed here, although details are beyond the scope of this disclosure.

The signal is routed through the matrix 803 via lead 811 to the RF and IF receive circuits 812. The receive path up to and through lead 813, the A/D conversion circuit 814, lead 815, demodulator 816, lead 817, and combined burst sync/error decode circuit 818 is substantially similar to the receive operations in the RP, and therefore the similarities will not be repeated. The key differences are as follows.

First, bits recovered by demodulator 816 are routed via lead 817 to a frame synchronization circuit 851 (essentially a programmable digital correlator) in control section 850. If the SU is not frame-synchronized to the downlink transmissions from an RP, then the frame synchronization circuit 851 is enabled. When the desired frame sync pattern is present in the demodulated bit stream, the frame synchronization circuit 851 triggers a reset of the sync and clock generation circuitry 856. If frame synchronization is subsequently verified, then normal receive operation can follow.

Second, the SU requires the use of a digital phase locked loop (PLL) 853 in order to maintain synchronization with the RP. After frame sync has been achieved, the SU is presumed to be able to demodulate TDM bursts and decode the codewords while obtaining burst synchronization information. Differences between SU and RP clocks will manifest themselves as slippage of codeword reference windows over time. The burst synchronization capability of circuit 818 can be used to indicate the magnitude and direction of slip, via lead 855, and used by the digital PLL 853 to apply correction signals to the clock circuitry 856 via lead 857. The decode error status must also be supplied in order to qualify the sync slip estimate and in addition may be used by the control section 850 and higher layer link maintenance protocols.

Third, the control section 850 and higher layer protocol software (not detailed in the figure) may make use of side information from the receive section 810 in order to maintain link quality and control the receive diversity process. Received signal strength indication (RSSI) is furnished by the RF and IF receive circuits 812 via lead 865. Also, certain demodulation schemes can provide indications of the quality of the received signal as viewed by the demodulation process that can be very useful in link maintenance. This is shown schematically by lead 854, connecting the control section 850 to demodulator 816.

After burst synchronization and error decoding, the recovered Slow and Fast Channel bit fields are forwarded to the receive buffer/rate changer 820 for further processing. The Slow Channel bits are typically extracted as signaling information and interpreted by a control processor (not shown in FIG. 8). In the case of a voice call, the Fast Channel will contain encoded speech bits that are relayed to the speech decoder 822. The speech decoder will convert the bits to analog voice waveforms that are sent to the handset interface 899. The choice of speech coding algorithm is not pertinent to this disclosure, although PACS specifies 32 kb/s ADPCM as a baseline voice service.

If the SU has successfully synchronized to an RP and has negotiated a connection to establish a call, then the transmit section 830 can accept encoded speech for radio link transmission. Analog waveforms from the handset interface 899 are encoded into digital information by the speech encoder 832, and the bits enter the transmit buffer/rate changer 834 over lead 833 at the encoding rate. The buffer/rate changer gathers a full Fast Channel worth of digitized speech, fills the Slow Channel field with the required signaling bits, and then passes the information stream to the channel encoder 836 over lead 835 at the radio link transmission rate.

The transmission operation is very similar to that in the RP: the channel encoder 836 computes the 15-bit CRC over the Slow and Fast Channel fields for the burst; the symbol mapper/pulse shaper 838 produces a filtered digital baseband waveform on the I and Q outputs 839 and 840, respectively; those digital waveforms are converted to analog signals by D/A conversion devices 841 and 842; and the baseband analog waveforms appearing on leads 843 and 844 are upconverted by direct modulator 845 to an intermediate frequency, before final RF conversion and power amplification in circuits 847, and transmission. If the SU implements a transmission diversity scheme, then the RF control 861 may issue an antenna control signal on lead 862 to the antenna switch matrix 803 in order to connect the chosen antenna 801 or 802 to the transmit circuits. Specification of the transmit diversity scheme is beyond the scope of this disclosure, but would follow practiced art.

In addition to previously described functions, the control section 850 also manages the tuning operations of the single or separate transmit and receive frequency synthesizers, via lead 863; enables the transmit power stages in RF and IF transmit circuits 847 via power control lead 864; and generates clocks and synchronization pulses for the other sections that are delivered schematically by leads 858 and 859. The control section typically operates under the supervision of a microcontroller that is running higher layer protocol software. The microcontroller has been omitted from FIG. 8 for clarity, since it does not directly perform the physical layer radio link functions that are addressed by the invention.

Now that a preferred example has been described, it is clear that the invention meets the above noted objects. Other advantages provided by the invention will be apparent to those skilled in the art. It should be understood that this example is merely illustrative of the invention. Many modifications and alternative configurations will be apparent without departing from the spirit and scope of the invention. For example, a multiprocessor implementation may be utilized to attain the essential functions of the above describe embodiments through software. The scope of the invention is intended to be described only by the following claims.

APPENDIX

GLOSSARY OF ACRONYMS

AM access manager
CRC cyclical redundancy check
DPQSK differential quadrature phase shift keying
FC Fast Channel
MTSO Mobile Telephone Switching Office
PACS Personal Access Communication Systems
PLL phase locked loop
RF radio frequency
RP radio port
RPCU radio port control unit
RSSI received signal strength indication
SC Slow Channel
SU subscriber unit
TDM time division multiplexed
TDMA time division multiple access

What is claimed is:

1. In a digital wireless communication system, a method for performing bit synchronization and error detection on a data burst containing a received word comprising the steps of:
   reading said data burst containing said received word into a buffer;
   obtaining in parallel from said data burst a plurality of candidate codewords which are positioned with respect to a reference position for said received word;
   obtaining a plurality of error syndromes from each of said plurality of candidate codewords;
   determining from said plurality of error syndromes whether bit errors exist in the candidate codewords, and whether a single candidate codeword falls within a predetermined range of positions; and
   where no bit errors are detected and a single candidate codeword for said received word falls within said predetermined range of positions, reading out said received word from a point which corresponds to a proper position.

2. The method of claim 1, wherein said candidate codewords are obtained by inserting marker bits into said data burst at successive increments along parallel processing paths and dividing each marked segment by a binary polynomial generator g(x) to yield said plurality of error syndromes.

3. The method of claim 2, wherein said marker bits are inserted by inverting values of successive sets of first and last bits of said candidate codewords which potentially delineate said received word.

4. The method of claim 2, wherein said successive increments correspond to a received communication symbol.

5. The method of claim 2, wherein said polynomial generator g(x) is $x^{15}+x^{14}+x^{13}+x^{12}+x^{11}+x^9+x^8+x^6+1$.

6. The method of claim 1, wherein said step of reading out said received word includes shifting said buffered data burst by an amount corresponding to said single position.

7. The method of claim 1, wherein said received word is discarded when it is determined from said error syndromes that: bit errors exist in said received word; no position for said received word is determined; or multiple positions for said received word are determined.

8. The method of claim 1, wherein said data burst is provided in parallel to a plurality of adders, each of said adders inverting respective sets of first and last bits of said candidate codewords which potentially delineate said received word to obtain parallel sets of marked words.

9. The method of claim 8, wherein said parallel sets of marked words are divided in parallel by a corresponding number of binary polynomial generators g(x) to yield said plurality of error syndromes.

10. The method of claim 9, wherein each of said plurality of error syndromes are output to determine whether any non-zero error syndromes occur.

11. The method of claim 1, wherein said data burst is an incoming TDMA burst received at a subscriber unit or a TDM packet received at a radio port.

12. The method of claim 1 wherein said wireless communication system is based on a PACS or PACS-UB standard.

13. The method of claim 1 wherein said data burst includes a cyclic codeword.

14. A method for transmitting an informational bit stream of digital data through a communication channel from a transmitter to a receiver and at said receiver for recovering bit synchronization and performing error detection of a corresponding received bit stream comprising the steps of:
   at the transmitter:
      determining a plurality of parity bits for the informational bit stream;
      generating a first cyclic codeword formed of the informational bit stream and said parity bits;
      inserting first marker bits in said first cyclic codeword so as to form a marked first cyclic codeword; and
      transmitting a first burst comprising said marked first cyclic codeword over said channel to said receiver; and
   at the receiver:
      receiving a second burst corresponding to said transmitted first burst from said channel, extracting from said second burst a received word corresponding to said marked first cyclic codeword, and reading said received word into a memory;
      obtaining in parallel from said second burst a plurality of candidate codewords which are positioned with respect to a reference position;
      obtaining a plurality of error syndromes from each of said plurality of candidate codewords;
      determining from said plurality of error syndromes whether bit errors exist in the candidate codewords, and whether a single candidate codeword falls within a predetermined range of positions; and
      where no bit errors are detected and a single candidate codeword for said received word falls within said predetermined range of positions, reading out said received word from a point which corresponds to a proper position.

15. The method of claim 14, wherein said candidate codewords are obtained by inserting marker bits into said received word at successive increments along parallel processing paths and dividing each resulting parallel marked word by a binary polynomial generator g(x) to yield said plurality of error syndromes.

16. The method of claim 15, wherein said marker bits are inserted by inverting values of successive sets of first and last bits of said candidate codewords which potentially delineate said received word.

17. The method of claim 15, wherein said successive increments correspond to a received communication symbol.

18. The method of claim 15, wherein said polynomial generator g(x) is $x^{15}+x^{14}+x^{13}+x^{12}+x^{11}+x^9+x^8+x^6+1$.

19. The method of claim 14, wherein said step of reading out said received word includes shifting said received word by an amount corresponding to said single position.

20. The method of claim 14, wherein said received word is discarded when it is determined from said error syndromes that: bit errors exist in said received word; no position for said received word is determined; or multiple positions for said received word are determined.

21. The method of claim 14, wherein said second burst is provided in parallel to a plurality of adders, each of said adders inverting respective sets of first and last bits of said candidate codewords which potentially delineate said received word to obtain parallel sets of marked words.

22. The method of claim 21, wherein said parallel sets of marked words are divided in parallel by a corresponding number of binary polynomial generators g(x) to yield said plurality of error syndromes.

23. The method of claim 22, wherein each of said plurality of error syndromes are output to determine whether any non-zero error syndromes occur.

24. The method of claim 14, wherein said second data burst is an incoming TDMA burst received at a subscriber unit or a TDM packet received at a radio port.

25. The method of claim 14, wherein said wireless communication system is based on a PACS or PACS-UB standard.

26. The method of claim 14, wherein said first data burst includes a cyclic codeword.

27. An apparatus for performing bit synchronization and error detection on a data burst containing a received word comprising:

a buffer memory;

means for reading said data burst containing said received word into said buffer memory;

means for obtaining in parallel from said data burst a plurality of candidate codewords which are positioned with respect to a reference position for said received word;

means for obtaining a plurality of error syndromes from each of said plurality of candidate codewords;

means for determining from said plurality of error syndromes whether bit errors exist in the candidate codewords, and whether a single candidate codeword falls within a predetermined range of positions; and means for reading out said received word from a point which corresponds to a proper position when no bit errors are detected and when a single position for said received word falls within said predetermined range.

28. The apparatus of claim 27, wherein said means for obtaining candidate codewords includes means for inserting marker bits into said data burst at successive increments along parallel processing paths and means for dividing each marked segment by a binary polynomial generator g(x) to yield said plurality of error syndromes.

29. The apparatus of claim 28, wherein said means for inserting marker bits inverts values of successive sets of first and last bits of said candidate codewords which potentially delineate said received word.

30. The apparatus of claim 28, wherein said successive increments correspond to a received communication symbol.

31. The apparatus of claim 28 wherein said polynomial generator g(x) is $x^{15}+x^{14}+x^{13}+x^{12}+x^{11}+x^9+x^8+x^6+1$.

32. The apparatus of claim 27, wherein said means for reading out said received word includes means for shifting said buffered data burst by an amount corresponding to said single position.

33. The apparatus of claim 27, wherein said received word is discarded when it is determined from said error syndromes that: bit errors exist in said received word; no position for said received word is determined; or multiple positions for said received word are determined.

34. The apparatus of claim 27, wherein said data burst is provided in parallel to a plurality of adders, each of said adders inverting respective sets of first and last bits of said candidate codewords which potentially delineate said received word to obtain parallel sets of marked words.

35. The apparatus of claim 34, wherein said parallel sets of marked words are divided in parallel by a corresponding number of binary polynomial generators g(x) to yield said plurality of error syndromes.

36. The apparatus of claim 35, wherein each of said plurality of error syndromes are output to determine whether any non-zero error syndromes occur.

37. The apparatus of claim 27, wherein said data burst is an incoming TDMA burst received at a subscriber unit or TDM packet received at a radio port.

38. The apparatus of claim 27, wherein said wireless communication system is based on a PACS or PACS-UB standard.

39. The apparatus of claim 27 wherein said data burst includes a cyclic codeword.

40. A system for transmitting an informational bit stream of digital data through a communication channel and for recovering bit synchronization and performing error detection of a corresponding received bit stream comprising:

a transmitter which includes:
means for determining a plurality of parity bits for the informational bit stream;
means for generating a first cyclic codeword formed of the informational bit stream and said parity bits;
means for inserting first marker bits in said first cyclic codeword so as to form a marked first cyclic codeword; and
means for transmitting a first burst comprising said marked first cyclic codeword over said channel to said receiver; and a receiver which includes:
a memory;
means for receiving a second burst corresponding to said transmitted first burst from said channel, extracting from said second burst a received word corresponding to said marked first cyclic word, and reading said received word into said memory;
means for obtaining in parallel from said second burst a plurality of candidate codewords which are positioned with respect to a reference position;

means for obtaining a plurality of error syndromes from each of said plurality of candidate codewords;

means for determining from said plurality of error syndromes whether bit errors exist in the candidate codewords, and whether a single candidate codeword falls within a predetermined range of positions; and means for reading out said received word from a point in said received word which corresponds to a proper position when no bit errors are detected and a single candidate codeword for said received word falls within said predetermined range of positions.

41. The system of claim 40, wherein said means for obtaining candidate codewords includes means for inserting marker bits into said received word at successive increments along parallel processing paths and means for dividing each resulting parallel marked word by a binary polynomial generator g(x) to yield said plurality of error syndromes.

42. The system of claim 41, wherein said means for inserting marker bits inverts values of successive sets of first and last bits of said candidate codewords which potentially delineate said received word.

43. The system of claim 41, wherein said successive increments correspond to a received communication symbol.

44. The system of claim 41, wherein said polynomial generator g(x) is $x^{15}+x^{14}+x^{13}+x^{12}+x^{11}+x^9+x^8+x^6+1$.

45. The system of claim 40, wherein said means for reading out said received word includes means for shifting said received word by an amount corresponding to said single position.

46. The system of claim 40, wherein said received word is discarded when it is determined from said error syndromes that: bit errors exist in said received word; no position for said received word is determined; or multiple positions for said received word are determined.

47. The system of claim 40, wherein said second burst is provided in parallel to a plurality of adders, each of said adders inverting respective sets of first and last bits of said candidate codewords which potentially delineate said received word to obtain parallel sets of marked words.

48. The system of claim 47, wherein said parallel sets of marked words are divided in parallel by a corresponding number of binary polynomial generators g(x) to yield said plurality of error syndromes.

49. The system of claim 48, wherein each of said plurality of error syndromes are output to determine whether any non-zero error syndromes occur.

50. The system of claim 40, wherein said second data burst is an incoming TDMA burst received at a subscriber unit or a TDM packet received at a radio port.

51. The system of claim 40, wherein said wireless communication system is based on a PACS or PACS-UB standard.

52. The system of claim 40, wherein said first data burst includes a cyclic codeword.

* * * * *